United States Patent [19]
Raats et al.

[11] Patent Number: 4,811,547
[45] Date of Patent: Mar. 14, 1989

[54] DEVICE FOR LOADING AND UNLOADING X-RAY FILM CASSETTES

[75] Inventors: Herman Raats, Wilryk; Manfred Schmidt, Kirchheim; Johann Zanner, Unterhaching, all of Fed. Rep. of Germany

[73] Assignee: Agfa-Gevaert AG, Leverkusen, Fed. Rep. of Germany

[21] Appl. No.: 152,021

[22] Filed: Feb. 3, 1988

[30] Foreign Application Priority Data

Feb. 12, 1987 [DE] Fed. Rep. of Germany ....... 3704260

[51] Int. Cl.⁴ .................. B65B 5/10; B65B 43/38; B65G 65/04
[52] U.S. Cl. .................................. 53/266 R; 53/382; 271/211; 271/309; 414/211
[58] Field of Search ............... 53/266 R, 244, 249, 53/381 R, 382, 167; 414/403, 404, 411, 416; 271/309, 195, 211, 97, 98, 99, 106, 283

[56] References Cited

U.S. PATENT DOCUMENTS

| 3,136,539 | 6/1964 | Lyman | 271/97 |
| 3,498,599 | 3/1970 | Smith | 271/211 |
| 3,828,195 | 8/1974 | Snarr | 414/411 |
| 3,891,854 | 6/1975 | Hura | 414/411 X |
| 4,049,142 | 9/1977 | Azzaroni | 414/411 X |
| 4,056,264 | 11/1971 | Dhooge et al. | 271/211 X |
| 4,354,336 | 10/1982 | Azzaroni | 414/411 X |
| 4,428,574 | 1/1984 | Kataoka | 271/211 X |
| 4,480,423 | 11/1984 | Müller | 53/382 X |
| 4,514,958 | 5/1985 | Hoorn | 53/382 X |
| 4,539,794 | 9/1985 | Azzaroni | 53/266 R X |
| 4,553,369 | 11/1985 | Debes et al. | 53/382 X |
| 4,577,452 | 3/1986 | Hösel et al. | 53/266 R |
| 4,590,738 | 5/1986 | Hösel et al. | 53/266 R |

FOREIGN PATENT DOCUMENTS 2151021 6/1972 Fed. Rep. of Germany .
2921008 11/1980 Fed. Rep. of Germany .
3232187 2/1985 Fed. Rep. of Germany .

Primary Examiner—Horace M. Culver
Attorney, Agent, or Firm—Michael J. Striker

[57] ABSTRACT

In a device for loading and unloading X-ray film cassettes at least one air blowing nozzle is provided which is positioned at the front open end of the cassette below the film inserting rollers so as to generate an air cushion between the film being inserted into the cassette and the bottom wall of the cassette during the insertion process.

8 Claims, 4 Drawing Sheets

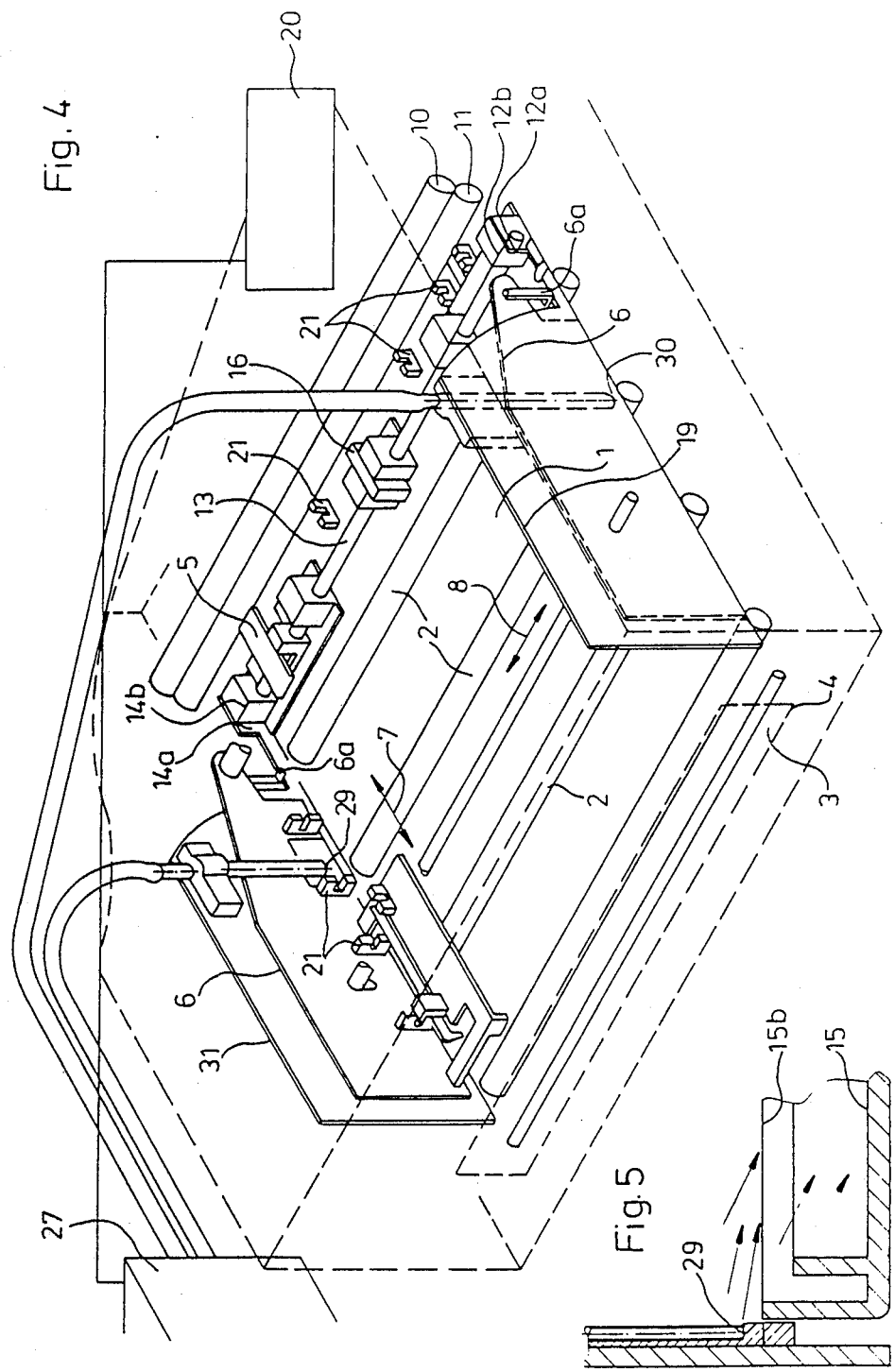

DEVICE FOR LOADING AND UNLOADING X-RAY FILM CASSETTES

BACKGROUND OF THE INVENTION

The present invention relates to a device for loading and unloading X-ray film cassettes.

Film cassette loading and unloading devices of the type under discussion have been known. Such devices include a compartment for receiving and accommodating a cassette, transport elements for the insertion of the cassette and discharging of the same from the compartment, means for light-sealed closing of the compartment opening for the insertion of the cassette, means for opening the cassette and lifting its lid, means for the removal of the film from the cassette and insertion of a new film into the cassette, means for determining a cassette format, means for positioning a cassette in the compartment with a device for moving the cassette in the direction transversal to the direction of its insertion, and an electronic control by means of which a new film is selected in correspondence with the format of the cassette accommodated in the device; these means and devices are consecutively controlled.

One of the devices of the tpe under consideration is disclosed in DE-PS No. 32 32 187. With this conventional device, a new film which must be inserted into an emptied cassette is transported by transport roller pairs or transport belts into the open cassette at the end face of the latter. The greater is the format of the cassette being loaded and that of the film being inserted the longer the film end would brush against the bottom wall of the cassette or a foil lying thereon. This would cause friction between the film and the reinforcement foil which friction would be so considerable that the correct position of the new film in the cassette would be prevented. With the cassettes of small formats into which films are loaded further difficulties occur when the film is positioned inside the cassette.

SUMMARY OF THE INVENTION

It is an object of the present invention to provide an improved device for loading and unloading X-ray film cassettes.

It is another object of the invention to provide a cassette loading-and-unloading device with which a surface contact between a film being inserted into the cassette and a reinforcement foil on the bottom wall of the cassette occurs first when the film has already approximately reached its predetermined position within the casette so that friction between the film and the reinforcement foil does not hinder the sliding of the film end towards the back side of the cassette.

These objects and other objects of the invention are attained by a device for loading and unloading X-ray film cassettes with films, the device comprising means defining a compartment for receiving a cassette; transport means for moving the cassette into and out of said compartment, said means defining a compartment including an insertion opening; means for light-tight closing said opening; means for opening a cassette having a liftable lid and a bottom portion; means for removing a film from the cassette and means for inserting a new film into the cassette; means for determining a cassette format; means for positioning the cassette in said compartment including means for displacement of said cassette in a direction transversal to a direction of the insertion thereof; an electronic control device; and at least one nozzle positioned at said means for inserting a new film and connected to and switchable by said control device so that said nozzle generates during the insertion of the new film into the cassette an air cushion between the film being inserted and a bottom wall of the cassette.

Said nozzle may be positioned against an insertion upper edge of the bottom portion of the cassette in the direction of insertion of the film in a region between a middle line of a cassette of a widest format and a middle line of a cassette of a next smaller format.

The means defining the compartment may include two opposite side walls and wherein two nozzles for generating said air cushion are provided each positioned at one of said side walls, each nozzle being positioned in a region of an upper edge of the bottom portion of the cassette.

One of said nozzles may be supported on said means for displacement of said cassette and be displaceable thereby.

The nozzles may be inclined to said direction of insertion of the film.

The device may further include an air supply pump connected to said nozzle and said control device and forming therewith an air blowing unit, said unit being switchable on by said control device only during the insertion into the cassette of a film of the greatest and the next smaller format.

Said unit may be set in operation by said control device within a period from the beginning of the insertion of the new film to a complete release of the film from said film inserting means.

The film removing means may include suckers and suckers are provided for removing films from a film supply magazine, said air pump being connected to said suckers and to said nozzles so that said pum provides a suction air for said suckers and a blast air for said nozzles.

With the device of this invention an air cushion is generated on the cassette bottom wall during the insertion of a new film into the open cassette, the front edge of the film being inserted does not come into contact with the bottom wall or the reinforcing foil on that bottom wall before that front edge has reached its final position within the cassette so that the film slides towards the rear side of the cassette on the air cushion. The film is thereby lifted from the bottom of the cassette during its insertion process.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 4 is a perspective view of the device of FIG. 3; and

FIG. 5 is a sectional view through the blast air nozzle of the device of FIG. 4.

DETAILED DESCRIPTION OF THE PREFERRED EMBODIMENTS

Figure 2:
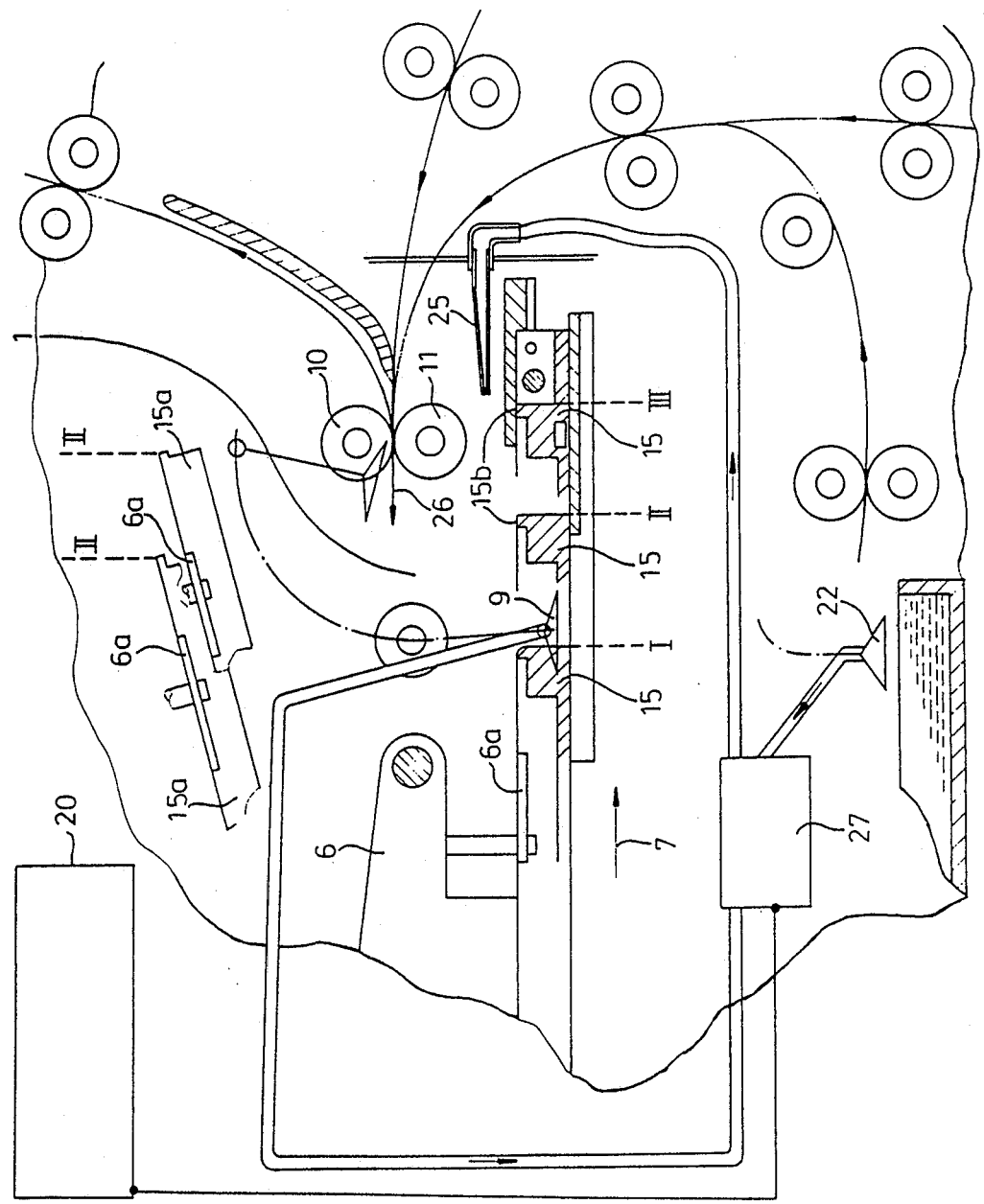
FIG. 2 is a detailed schematic side view of the device for loading and unloading the X-ray cassette of FIG. 1.

Referring now to the drawings in detail, two proposed embodiments of the invention are shown in FIGS. 2 and 4. A device of this type has been disclosed in DE-PS No. 32 32 187. The invention, however, can be employed in other flat film cassette-loading and unloading devices for cassettes with detachable lids and operated on the same principle.

Only important features of the conventional device for loading and unloading flat film cassettes 15 will be described herein, which features are required for understanding the exemplified embodiments.

FIGS. 2 and 4 illustrate conventional structural components of the device and the elements of this invention as well. As shown in FIG. 4, reference numeral 1 designates a compartment for receiving a cassette, and reference numeral 2 denotes a transporting means for inserting and discharging the cassette. Transporting means 2 are formed by transport rollers which are positioned at the bottom of the compartment 1. A cover 3 for a light-tight closing of the insertion opening 4 of the compartment 1 is shown schematically. A known element 5 for releasing an abutment of the cassette, which will be explained in detail below, is provided at the front side in compartment 1. The cassette-releasing or opening element 5 which is a slide in the exemplified embodiment, can have a non-uniform toothing which comes into engagement with a locking bar of the cassette and then the other locking bar is actuated by the movement transversely to the direction of the cassette transport 7 so that the cassette lid, for example due to the action of weak springs, rebounds or is lifted by a hook 6a positioned on a pivotable side wall 6.

The slide 5 must be displaceable in the direction 8 transversal to the direction 7 of insertion of the cassette in such a fashion that the opening device can be automatically adjusted to different types of usable cassette formats. Conventional elements 9, 10, 11 for the removal of the film from the cassettes and the insertion of a new film into the cassettes are positioned at the front side of the device above and/or downstream of the slide 5 for opening the cassette. These loading-unloading elements are mainly comprised of suitable suckers 9 (FIG. 2) controlled by an electronic control device 20, and corresponding transport roller pairs 10, 11. Remaining components of the device of FIGS. 2, 4 are known, and the device is also provided with a non-shown film supply magazine which contains films of different formats, with which the cassettes of different formats used in the device must be loaded. In addition, either an intermediate magazine for collecting the films removed from the cassette is provided or it is directly connected to the developing machine for the removed films.

The determination of the format of a given cassette and the selection and feeding of a new suitable film takes place automatically, for example, after an automatic measurement of at least one cassette side. Before or during determining the format of the cassette being selected the cassette must be precisely positioned.

For the above mentioned purpose a device for a transverse displacement relative to the insertion direction 7 is provided, which device must be movable in the directions indicated by double arrow 8. This transversal displacement device has a clamping jaw 12 formed by rectangular pieces 12a, 12b which, at the same time, is connected with the remaining displacement parts or elements 6, 6a, 19 for positioning cassettes 15. The clamping jaw 12 is displaceable relative to a further clamping jaw 14 which is formed by rectangular angled pieces 14a, 14b. Clamping jaw 14 is stationary in respect to the transversal direction of displacement 8. Legs 14a, 14b form a lateral and front stop for the cassette 15 transported by means into compartment 1 by means of transport rollers 2. Both clamping jaws 12, 14 are arranged on a bar 13 such that their legs or portions 12b and 14b directed towards each other are in alignment with one another. The cassette 15 which is transported towards the steps 14a, 14b is also merely clamped due to the movement of the clamping jaw 12 and is therebetween positioned. The cassette being transported between the clamping jaw 14 and clamping jaw 12 positioned in its initial position is, upon the movement of the clamping jaw 12 and under additional action of transporting rollers 2 is moved relative to the stops 14a, 12a and aligned between the portions 14a, 12a. Switching contacts 16 are provided between portions 14b and 12b of the clamping jaws 12, 14 with cassettes of various size or at the portions 14b or 12b. These switching contacts are switched on to provide a device for clamping components 12b, 14b when a new cassette 15 is inserted into the device. Furthermore, switches 21 are provided which can be formed, for example, as light limiting switches or microswitches which are passed by switching arms during the positioning movement of the cassette and determine the cassette format by a control device 20. It is, of course, understandable that any other suitable known device for scanning the cassette format and cassette positioning can be utilized.

As can be seen from FIG. 2 a cassette 15, 15a provided, in the known fashion, with a pivotable or liftable lid 15a, can be displaced from the first stop position I in which the device for transversal displacement 12, 19, 6 is switched on to the second position II in which lid 15a is opened and an exposed film is removed from the cassette by sucker 9, and from there to a third position III further in the direction of arrow 7 in which a new film is inserted into the cassette 15. For transporting the exposed film out from the device and inserting a new film serves a transport roller pair 10, 11 positioned immediately before the cassette front side or its upper edge 15b. Thereby a further sucker 22 is provided which serves the purpose of the removal of a new film of a respective film supply magazine. The film is fed to the transport roller system until it reaches the insertion roller pair 10, 11.

Figure 1:
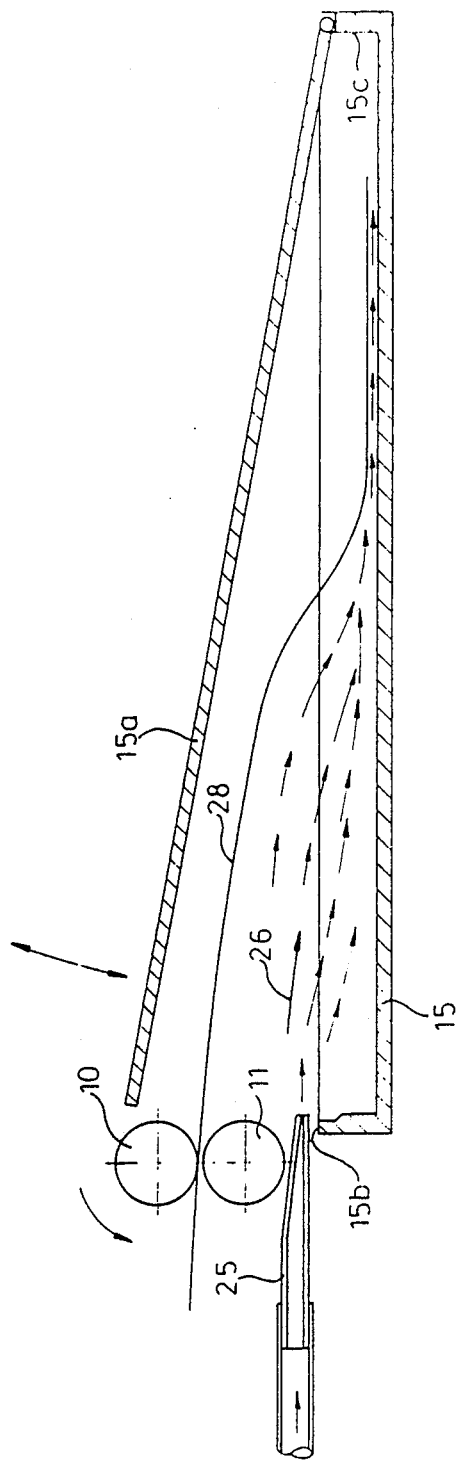
FIG. 1 is a sectional view of the X-ray cassette with a device for loading the cassettes, shown schematically.

The device according to the invention is shown in FIG. 1, in which a nozzle 25 is shown provided at and above the upper edge 15b of the bottom part of the cassette 15. FIG. 1 illustrates the film cassette in the aforementioned loading position III. Nozzle 25 extends in the film-inserting direction 26 which is approximately parallel to the direction of arrow 7 in FIG. 4 and is connected with an air pump 27 as well as suckers 9, 22. The air pump 27 shown in FIGS. 2 and 4 is connected to the electronic control device 20 so that the pump and the suckers and the nozzle 25 are switched on and off by the electronic control device 20. Thereby the suckers 9, 22 are connected to the suction side of the pump while nozzles 25 are connected to the blower side of the pump. It is an optimal case, however, when the nozzles 25 lie approximately in the middle of the width of the cassette in the direction of arrow 8. This is not possible, however, with the loading of cassettes having great differences in widths. It is expedient when the nozzle 25 is positioned so that it lies between the central line of the widest cassette utilized and the central line of the smallest usable cassette, as viewed in the direction of arrow 7. Inasmuch as the problem of positioning a film in the cassette in case of small film formats does not occur it is also expedient to design the control device 20 so that the pump 27 would be switched on only when a film 28 (FIG. 1) of the large format is inserted into a respective large cassette whereas upon the recognition of the small cassette format the control device 20 will not be switched on. The air blasting unit formed by pump 27 and nozzles 25 is also switched on only as long as a new film sheet 28 is inserted into the cassette 15, also approximately before roller pair 10, 11 starts moving until the inserted film 28 is released by rollers 10, 11.

As seen in FIG. 1, nozzle 25 forms an air cushion between the film 28 being inserted into the cassette 15 and the bottom of the cassette or the reinforcement foil, provided on the bottom of the cassette. Thereby the end of the film 28 does not come into contact with the bottom wall or the reinforcement foil of the cassette but a thin air layer guides the film towards the back side 15c of the cassette until the film takes a desired position in which the end of the inserted film lies against the back side 15c of the cassette. Upon the release of the film from rollers 10, 11 or shortly before this or upon reaching the desired position of the film 28 the air blast unit 25, 27 is switched off so that the film 28 can slide further to back side 15 and/or downwards on the bottom wall of the cassette.

Figure 3:
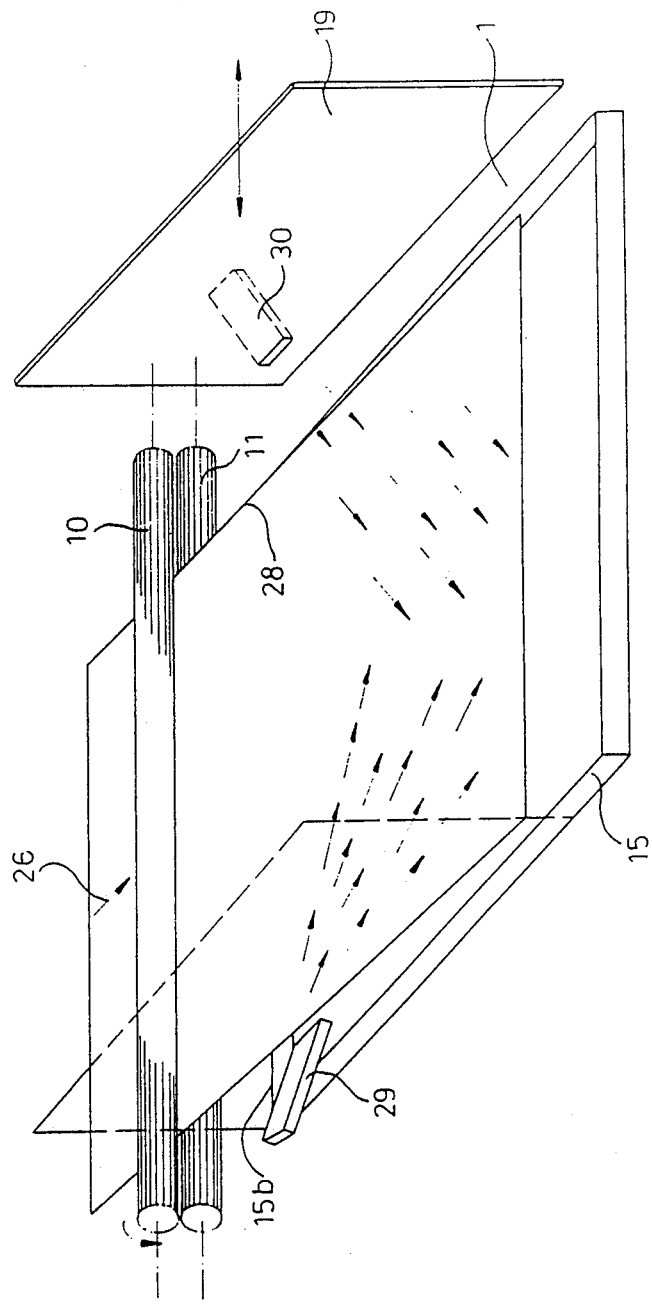
FIG. 3 is a schematic view of the portions of the device of another embodiment of the invention.

FIGS. 3 to 5 illustrate a modified arrangement of the air blowing nozzles 29, 30. Nozzles 29, 30 in this embodiment are positioned not in the direction of the film insertion 26 but are secured laterally of two side walls 19 and 31 of compartment 1, which walls are parallel to the cassette transport direction 7. Thus the nozzle 30 is moved along with the part 19 of the transversal displacement device. The position of nozzle 30 is also adjusted to the width of the cassette in the direction of arrows 8. Both nozzles 29, 30 are positioned opposite one another in the direction 8. These nozzles can be directed towards each other (FIG. 5). It is also possible to position nozzles 26 and 30 at an angle to the film insertion direction 26 as shown in FIG. 5. Furthermore, it is possible with this arrangement that air blowing unit 29, 30, 27 be not switched on in case a film is inserted into the cassette of a a smaller size. This arrangement of the nozzles causes the formation of an air cushion between the bottom wall of the cassette and the film being inserted into the cassette so that this air cushion guides the film to its predetermined position without contacting the bottom of the cassette. It should be noted that such a contact which occurs in conventional devices of the foregoing type causes braking of the film insertion process.

It is, of course, understandable that any other suitable arrangements of the nozzles are possible. For example, in place of one nozzle 25 arranged at the end face of the cassette a plurality of such nozzles 25 can be uniformly positioned at that face which would supply weaker air streams. Also possible is the arrangement of two nozzles each positioned respectively at either side of compartment 1 in the direction of arrow 7.

It will be understood that each of the elements described above, or two or more together, may also find a useful application in other types of devices for loading and unloading X-ray film cassettes differing from the types described above.

While the invention has been illustrated and described as embodied in a device for loading and unloading X-ray film cassettes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A device for loading and unloading X-ray film cassettes with films, the device comprising means defining a compartment for receiving a cassette; transport means for moving the cassette into and out of said compartment, said means defining a compartment including an insertion opening; means for light-tight closing said opening; means for opening a cassette having a liftable lid and a bottom portion; means for removing a film from the cassette and means for inserting a new film into the cassette; means for determining a cassette format; means for positioning the cassette in said compartment including means for displacement of said cassette in a direction transversal to a direction of the insertion thereof; an electronic control device; and at least one nozzle positioned at said means for inserting a new film and connected to and switchable by said control device so that said nozzle generates during the insertion of the new film into the cassette an air cushion between the film being inserted and a bottom wall of the cassette.

2. The device as defined in claim 1, wherein said nozzle is positioned against an insertion upper edge of the bottom portion of the cassette in the direction of insertion of the film in a region between a middle line of a cassette of the widest format and a middle line of a cassette of the next smaller format.

3. The device as defined in claim 1, wherein said means defining the compartment include two opposite side walls and wherein two nozzles for generating said air cushion are provided, each positioned at one of said side walls, each nozzle being positioned in a region of an upper edge of the bottom portion of the cassette.

4. The device as defined in claim 3, wherein one of said nozzles is supported on said means for displacement of said cassette and is displaceable thereby.

5. The device as defined in claim 3, wherein said nozzles are inclined to said direction of insertion of the film.

6. The device as defined in claim 1, further including an air supply pump connected to said nozzle and said control device and forming therewith an air blowing unit, said unit being switchable on by said control device only during the insertion into the cassette of a film of the greatest and the next smaller format.

7. The device as defined in claim 6, wherein said unit is set in operation by said control device within a period from the beginning of the insertion of the new film to a complete release of the film from said film inserting means.

8. The device as defined in claim 6, wherein said film removing means include suckers, and suckers are provided for removing films from a film supply magazine, said air pump being connected to said suckers and to said nozzles so that said pump provides a suction air for said suckers and a blast air for said nozzles.

* * * * *